United States Patent Office 3,328,405
Patented June 27, 1967

3,328,405
PROCESS FOR THE PRODUCTION OF SUBSTITUTED PYRIMIDINES
Raymond A. Simone, Walnut Creek, and Mervin E. Brokke, Richmond, Calif., assignors to Stauffer Chemical Company, New York, N.Y., a corporation of Delaware
No Drawing. Filed May 22, 1964, Ser. No. 369,619
4 Claims. (Cl. 260—251)

This invention relates to an improved process for the preparation of pyrimidyldithiophosphates. Specifically, this invention is concerned with an improved process for the preparation of O,O-dialkyldithiophosphoryl derivatives of pyrimidines.

Compounds of the present invention find particular utility as agricultural chemicals and especially in the control of various destructive insects. The importance of the pyrimidine nucleus in many biological systems is well known. The occurrence of pyrimidine bases as components of nucleic acids and other biologically important chemicals has prompted extensive studies not only of their biogenesis and biochemical functions but also of the possibility of pyrimidine and pyrimidyl derivatives as active pesticidal substances.

In view of certain biogenetic concepts, it is not surprising to find that certain derivatives of pyrimidines can function as growth factors for microorganisms and, moreover, that substances of related structure can function as metabolite antagonists.

Heretofore, the pyrimidyldithiophosphates were generally prepared by a series of reactions comprising the steps (1) the chlorination of the parent hydroxy pyrimidine, (2) aqueous quenching and subsequent extraction with an organic solvent, (3) removal of the organic solvent and purification of the chloropyrimidine by distillation, and (4) the condensation of the chloropyrimidine and a dialkyl metal or ammonium dialkyldithiophosphate. The steps which pertain to the extraction of the chlorination reaction mass in order to obtain the intermediate, chloropyrimidine, are very inefficient and yield poor recovery of the product.

The process of the present invention offers advantages over the above-mentioned process in that it results in more efficient and improved yields of the desired pyrimidyldithiophosphates. The compounds embodied within this invention may be represented by the following structure:

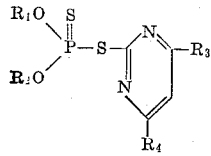

wherein $R_1$ and $R_2$ are lower alkyl and $R_3$ and $R_4$ are selected from the group consisting of hydrogen and lower alkyl.

A general object of the present invention is, therefore, to provide an improved process for preparing pyrimidyldithiophosphates.

More specific objects in accordance with the present invention are modifications in the process for preparing pyrimidyldithiophosphates, said modifications consisting of the elimination of the steps of aqueous quenching and isolation of the intermediate chloropyrimidine providing thereby means for more closely controlled reaction conditions.

As a basis for the improved process of the present invention it has been found that, if the parent hydroxypyrimidine is chlorinated with excess phosphorus oxytrichloride in the presence of a weak tertiary amine such as dimethylaniline, and the excess phosphorus oxytrichloride then removed and the chlorinated residue quenched in water, the condensation reaction between the chloropyrimidine and the alkali metal dialkyldithiophosphate can be carried out without further purification of the intermediate chloropyrimidine. It was also found that the quenched chlorinated residue gave improved yields of pyrimidyldithiophosphates when the residue solution was adjusted to a pH of about 3 to about 6 with caustic prior to the condensation reaction.

An important factor in the successful application of the process of the invention is the use of the reaction mixture without the isolation and purification of the intermediate chloropyrimidine. The steps of extraction, stripping of the solvent and subsequent distillation of the chloropyrimidine was found to decrease the over-all yield of pyrimidyldithiophosphate. There is also a matter of handling and transfer of the materials involved in extraction, stripping and distillation, which by far makes it much more convenient to proceed from the 2-hydroxypyrimidine without isolation of the chloro intermediate.

The hydroxypyrimidine starting material can be either substituted or unsubstituted. There can be used hydroxylower alkyl pyrimidine, wherein the lower alkyl substitution can be singular or plural up to and including three groups.

The chlorination reaction is conducted under substantially anhydrous conditions. Moisture should be absent from all materials charged into the chlorination reactor since it has been found that the presence of moisture will adversely affect the chlorination and misdirect the reaction.

The chlorination reaction was found to be aided by the presence of a weak or neutral tertiary amine solvent. The class N,N-dialkylaniline was found to be the most satisfactory, and N,N-dimethylaniline as the preferred compound. The amine is not destroyed or used up in the reaction mechanism, so that it can be carried throughout the remainder of the process without any adverse effects on the subsequent reactions. In the final separation the amine is removed as the hydrochloride salt in the aqueous phase, which then can be neutralized with base to recover the free amine. This is dehydrated by conventional methods and recycled to be used in further chlorination reactions.

The chlorination reaction when using a chlorinator such as phosphorus oxytrichloride proceeds rapidly when carried out in the above mentioned N,N-dimethylaniline solvent and the time for completion is generally not a critical factor. The time will be determined to a large extent by the temperature, thoroughness of mixing and quantities employed. There does exist a relationship between the temperature used and the rate of reaction obtained that is inversely proportional. Upon employing a higher temperature for carrying out the chlorination the completion of the reaction can be hastened. The optimization of chlorination conditions can be determined by a secondary means which indicates that the chlorination is essentially complete when the reaction mass is homogeneous. As an example of the relationship between temperature and reaction time, at 140° C. homogeneity of the chlorination mixture can be accomplished in seven minutes, while at 105–110° C. it requires 45 minutes to reach a homogeneous state. The higher temperatures should be discouraged since the destruction of 2-chlorodialkyl pyrimidines is relatively rapid at the higher temperatures. Therefore, moderate temperatures are preferred at which to carry out the chlorination of the hydroxy dialkyl pyrimidines.

After the chlorination reaction of the hydroxypyrimidine was complete, the termination of which was indicated by homogeneity of the reaction mass, the mass was transferred to a distillation unit. Preferably a vacuum distillation unit should be used to effect rapid stripping of the excess chlorinating agent. Stripping can be carried out at about 70–40 mm. Hg and at a maximum temperature of 90 to 110° C.

The crude chloropyrimidine prepared in the above step was charged into another reactor already containing water at 50–60° C. The said reactor was equipped with an agitator, temperature sensing device, pH electrodes and reflux condenser. The reaction with water was exothermic and was controlled by the rate of addition of the crude chlorination product and by external cooling. The end of the hydrolysis was indicated by a lack of heat evolution, after the addition of crude material was completed.

The hydrolysis reactor was cooled to approximately 20° C. The titration of the highly acid solution with sodium hydroxide solution was then begun. The initial pH before addition of base was approximately 0.3. Sufficient base was added to bring the pH to 2.5 at 25° C., at which time the addition of the alkali metal or ammonium diethyldithiophosphate in aqueous solution was made. After the addition of the particular phosphate salt was completed the pH was further adjusted with base to a pH from about 3 to about 6. The preferred range is from a pH of about 4.0 to about 4.5. This then allows the condensation to take place without the necessity of extraction and separation of the chloropyrimidine.

In order to accomplish the above-mentioned condensation reaction it is necessary for the solution to have a pH of between 3 to 6. Below a pH of about 3 low yields will be obtained and above a pH of about 6 the reaction will not proceed to a satisfactory completion. For optimum results it is preferred to hold the pH of the media to between 4.0 and 4.5. The amount of acid required to produce a pH in this range will depend upon the concentration of the titrating base, as well as upon the resulting pH of the hydrolysis solution. Thus at an excessively low range of pH, say less than 1.0, a greater amount of base will have to be added to produce a pH of at least 3.0 and preferably at least 4.0, than at subsequently higher pH values. Similarly the amount of base required will depend upon the ionization constant of the base employed.

The ratio in which the reactants are used is not critical, although high molar excesses of dithiophosphate will give rise to decreased yields and high concentrations of neutral organic phosphates. Conversely an excess of chloropyrimidine will leave unreacted material in the final reaction mass which gives extreme difficulty in washing and separation due to a tendency to form emulsions. The ratio, moles of dithiophosphate to moles of hydroxypyrimidine originally charged to the chlorination, will normally be between 1.00 and 2.00. Preferably, the mole ratio will lie between about 1.05 and 1.20. It is not essential, however, for operability that a particular range of mole ratios be used. The mole ratio which is employed will generally be the ratio which provides the maximum economic use of the hydroxypyrimidine.

In the practice of the invention it was found that the coupling reaction proceeded smoothly in an inert organic solvent in which the reactants are soluble. The presence of the solvent facilitates the reaction as well as acting as a solvent for the removal of the pyrimidyldithiophosphate. This is accomplished by adding thereto an appropriate liquid medium, preferably an aromatic organic solvent, such as toluene, benzene or xylene, that is a solvent for the two reactants. The resultant product is also soluble in the solvent and is recovered from the solvent. The two phases thereby produced were separated and the organic layer subsequently washed to free it of base. The washed organic phase was then vacuum distilled to remove the solvent. A vacuum range of from 50 to 10 mm. Hg absolute was normally required. The still was vented and the product sparged with nitrogen at about 45–60° C. to remove residual solvent. The pure product was then recovered free from solvent using conventional techniques.

The following examples illustrate the process of this invention.

Example 1

*Preparation of S-(4,6-dimethylpyrimidyl-2)-O,O-diethylphosphorodithioate.*—2 - hydroxy - 4,6 - dimethylpyrimidine hydrochloride (160.5 g., 1.0 mole) and phosphorus oxychloride (306.8 g., 2.0 moles) were placed in a glass reactor equipped with a thermometer, agitator and reflux condenser. Added to this was 242.4 g. (2.0 moles) of dimethyl aniline with stirring. The reaction vessel was heated to 90° C. Heating was then discontinued and the temperature was allowed to rise spontaneously to 105° C. The temperature was moderated between 105–110° C. for 45 minutes. Upon completion of the chlorination the reaction mass cooled to 60° C. The excess phosphorus oxychloride was removed at 50 mm. Hg with a maximum pot temperature of 100° C. The pot residue was then added slowly to 450 ml. water maintained at 50–60° C. by external cooling.

The aqueous solution of chloropyrimidine was cooled to 20° C. and the pH adjusted to 2.5 with 50% sodium hydroxide. Sodium diethyldithiophosphate (260 g., 1.25 moles) was then added, and the final pH was adjusted to 4.0 to 4.2 with sodium hydroxide. Toluene (600 ml.) was then added, and the mixture was stirred and heated under reflux for three hours. The toluene layer was separated and washed with 6% hydrochloric acid until free of dimethylaniline. It was then washed with water and finally with sodium bicarbonate solution. The toluene was removed under reduced pressure at a temperature below 55° C. Upon cooling the product crystallized. It was then recrystallized from hexane, M.P. 43–44° C., yield 231 g., 79% based on 2-hydroxy-4,6-dimethylpyrimidine hydrochloride.

Example 2

*Preparation of S-pyrimidyl-2-(O,O-diethylphosphorodithioate).*—2-chloropyrimidine was prepared using the chlorination technique taught in Example 1. Then sodium diethyldithiophosphate (26.0 g., 0.125 mole) and the 2-chloropyrimidine (11.5 g., 0.1 mole) were mixed together. After adjusting the pH to 4.0 to 4.5 the reactants were heated under reflux with stirring for two and one-half hours in 200 ml. of benzene. The mixture was cooled to room temperature and filtered. The benzene solution was washed successively with brine, cold dilute sodium hydroxide and brine. It was then dried over magnesium sulfate and the benzene was evaporated under reduced pressure. The yield of analytically pure, pale yellow liquid was 19.7 g., 74.5%, $n_D^{30}$ 1.5620.

Example 3

*Preparation of S-(4,6-dimehtylpyrimidyl-2)-O-methyl-O-i-propyl phosphorodithioate.*—In a similar manner as Examples 1 and 2 above, the aqueous solution of 2-chloro-4,6-dimethylpyrimidine was adjusted in pH to 2.5 with base. Sodium methyl isopropyldithiophosphate was then added, and the final pH adjusted to 4.0 to 4.5 with potassium hydroxide (28 g. in 500 ml. water). Toluene (500 ml.) was added and the mixture stirred and heated under reflux for three hours. The toluene layer was separated and washed to free it of dimethylaniline. The toluene layer was then further washed, dried and evaporated under reduced pressure at a temperature below 55° C. The yield of pale yellow liquid product was 102 g., $n_D^{30}$ 1.5418.

Various changes and modifications may be made in the process described herein as will be apparent to those skilled in the chemical arts to which it pertains. It is accordingly intended that the present invention shall only be limited by the scope of the appended claims.

We claim:
1. An improved process for the preparation of O,O-di- alkyldithiophosphoryl derivatives of pyrimidines represented by the structure

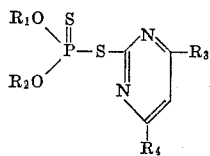

wherein $R_1$ and $R_2$ are lower alkyl and $R_3$ and $R_4$ are selected from the group consisting of hydrogen and lower alkyl, said improvement comprising contacting the corresponding 2-chloropyrimidine and dialkyl dithiophosphate salt in a reaction media at a pH of about 3 to about 6.

2. The improved process of claim 1 wherein said reaction media has a pH of about 4 to about 5.

3. The improved process for the preparation of S-(4,6-dimethylpyrimidyl - 2) - O,O - diethylphosphorodithioate, said improvement comprising contacting the crude 2-chloro-4,6-dimethylpyrimidine in the presence of the initial chlorination mass, with diethyldithiophosphate salt in a reaction media at a pH of about 3 to about 6.

4. The improved process of claim 3 wherein said reaction media has a pH of about 4 to about 5.

References Cited

UNITED STATES PATENTS

| | | | |
|---|---|---|---|
| 2,852,514 | 9/1958 | Schrader et al. | 260—979 |
| 2,862,017 | 11/1958 | Schrader et al. | 260—979 |
| 2,910,501 | 10/1959 | Dorken et al. | 260—979 |
| 2,976,309 | 3/1961 | Shrader | 260—979 |
| 3,076,009 | 1/1963 | Shrader et al. | 260—979 |

NICHOLAS S. RIZZO, *Primary Examiner.*